United States Patent [19]

Strait et al.

[11] Patent Number: 5,297,907
[45] Date of Patent: Mar. 29, 1994

[54] PORTABLE MACHINE TOOL

[75] Inventors: David S. Strait, Newberg; Arlan W. Way, Gladstone, both of Oreg.

[73] Assignee: Climax Portable Machine Tools, Inc., Newberg, Oreg.

[21] Appl. No.: 836,094

[22] Filed: Feb. 14, 1992

[51] Int. Cl.$^5$ .................... B23C 1/20; B23B 39/14
[52] U.S. Cl. ............................. 409/238; 408/234; 409/175
[58] Field of Search .......... 409/238, 175, 337, 286; 408/234; 29/469, 452

[56] References Cited

U.S. PATENT DOCUMENTS

| | | | |
|---|---|---|---|
| 1,740,053 | 12/1929 | Wehr | 52/731.2 |
| 2,747,469 | 5/1956 | Ernst et al. | 409/103 |
| 2,789,480 | 4/1957 | Wellauer | 409/235 |
| 2,827,836 | 3/1958 | Horth et al. | 409/99 |
| 2,912,905 | 11/1959 | Berthiez | 409/238 |
| 3,097,568 | 7/1963 | Kampmeier | 408/234 X |
| 3,523,485 | 8/1970 | Klein | 409/202 |
| 3,543,635 | 12/1970 | Galbarini | 409/132 |
| 3,650,178 | 3/1972 | Appleton | 409/202 |
| 3,656,860 | 4/1972 | Neuman | 409/238 X |
| 3,730,051 | 5/1973 | Hatzig | 409/238 |
| 3,761,194 | 9/1973 | Wagner | 409/238 X |
| 3,800,636 | 4/1974 | Zagar | 408/234 X |
| 3,810,337 | 5/1974 | Pollard | 52/223 R |
| 4,629,408 | 12/1986 | Giron | 29/452 X |

FOREIGN PATENT DOCUMENTS 755501 8/1980 U.S.S.R. ............................ 408/234

Primary Examiner—William Briggs
Attorney, Agent, or Firm—Dellett and Walters

[57] ABSTRACT

A machine tool comprises an elongated beam adapted to be supported in a horizontal orientation at two locations spaced apart therealong and adapted to support a machining head. Tensioning bars extend parallel to the beam and engage the beam at opposite ends thereof. At least one of the tensioning bars is below the medial plane of the beam, and the tensioning bars are selectively operable to eliminate deflection from the beam.

10 Claims, 2 Drawing Sheets

PORTABLE MACHINE TOOL

CROSS-REFERENCE TO RELATED APPLICATION

Reference is made to co-pending U.S. patent application Ser. No. 07/590,240 filed Sep. 28, 1990, now U.S. Pat. No. 5,106,243 issued Apr. 21, 1992, the disclosure of which is hereby incorporated by reference herein.

BACKGROUND OF THE INVENTION

This invention relates to a portable machine tool, and particularly a machine tool for machining a large area.

Numerous machine tools have been designed to allow machining of a large area. For example, Appleton, U.S. Pat. No. 3,650,178, discloses a milling machine having two horizontal guide rails supporting a beam that is displaceable along the rails, and a machining head mounted on the beam and movable therealong. Klein, U.S. Pat. No. 3,523,485, discloses a machine that is similar in some ways to that of Appleton.

In certain applications, it is desirable to be able to mill a large area of work without transporting the work to a machine shop. The co-pending U.S. patent application Ser. No. 07/590,240 discloses a portable milling machine, which allows work to be machined in situ. The milling machines shown by Appleton and Klein are not designed to be portable and therefore are not suitable for this application.

A machine tool based on the design shown by Appleton is somewhat limited with respect to machining accuracy when the horizontal guide rails are spaced widely apart, because the beam is then deflected under its own weight between its points of support on the rails. Deflection can be prevented by employing a beam whose cross sectional shape is such that the beam is very stiff. Generally, however, a beam that is very stiff will have a large mass, and this is not favorable with regard to portability.

The portable milling machine disclosed in the co-pending U.S. patent application Ser. No. 07/590,240 is designed to allow milling of a surface that is disposed either above or below the milling tool. It is sometimes necessary also to be able to mill a surface that is disposed vertically, and in the case of a milling machine in which the machining head is mounted on a beam, this may necessitate rotation of the beam about its longitudinal axis through 90° relative to its orientation when used to mill a horizontal surface. A beam whose cross-sectional shape is such that the beam is very stiff with respect to bending in a first plane is not generally stiff with respect to bending in a plane perpendicular to the first plane unless the beam has a large mass, and this is not favorable with regard to portability.

SUMMARY OF THE INVENTION

According to a first aspect of the present invention there is provided a machine tool comprising an elongated beam adapted to be supported in a horizontal orientation at two locations spaced apart therealong and adapted to support a machining head, and tensioning members extending parallel to the beam and engaging the beam at opposite ends thereof, at least one of the tensioning members being below the medial plane of the beam, the tensioning members being selectively operable to eliminate deflection from the beam.

According to a second aspect of the present invention there is provided a machine tool comprising first and second spaced parallel guide rails, an elongated beam supported in a horizontal orientation by the guide rails and adapted to support a machining head, and tensioning members extending parallel to the beam and engaging the beam at opposite ends thereof. At least one of the tensioning members is below the medial plane of the beam, and the tensioning members are selectively operable to eliminate deflection from the beam. Each guide rail comprises a profiled guide member and threaded bar, and the beam is provided at each end with a carriage that is in sliding engagement with the profiled guide member and includes a nut in threaded engagement with the threaded rod and means for driving the nut to rotate relative to the carriage, whereby the carriage is driven lengthwise of the rail.

BRIEF DESCRIPTION OF THE DRAWINGS

For a better understanding of the invention, and to show how the same may be carried into effect, reference will now be made by way of example, to the accompanying drawing, in which.

DETAILED DESCRIPTION

Figure 1:
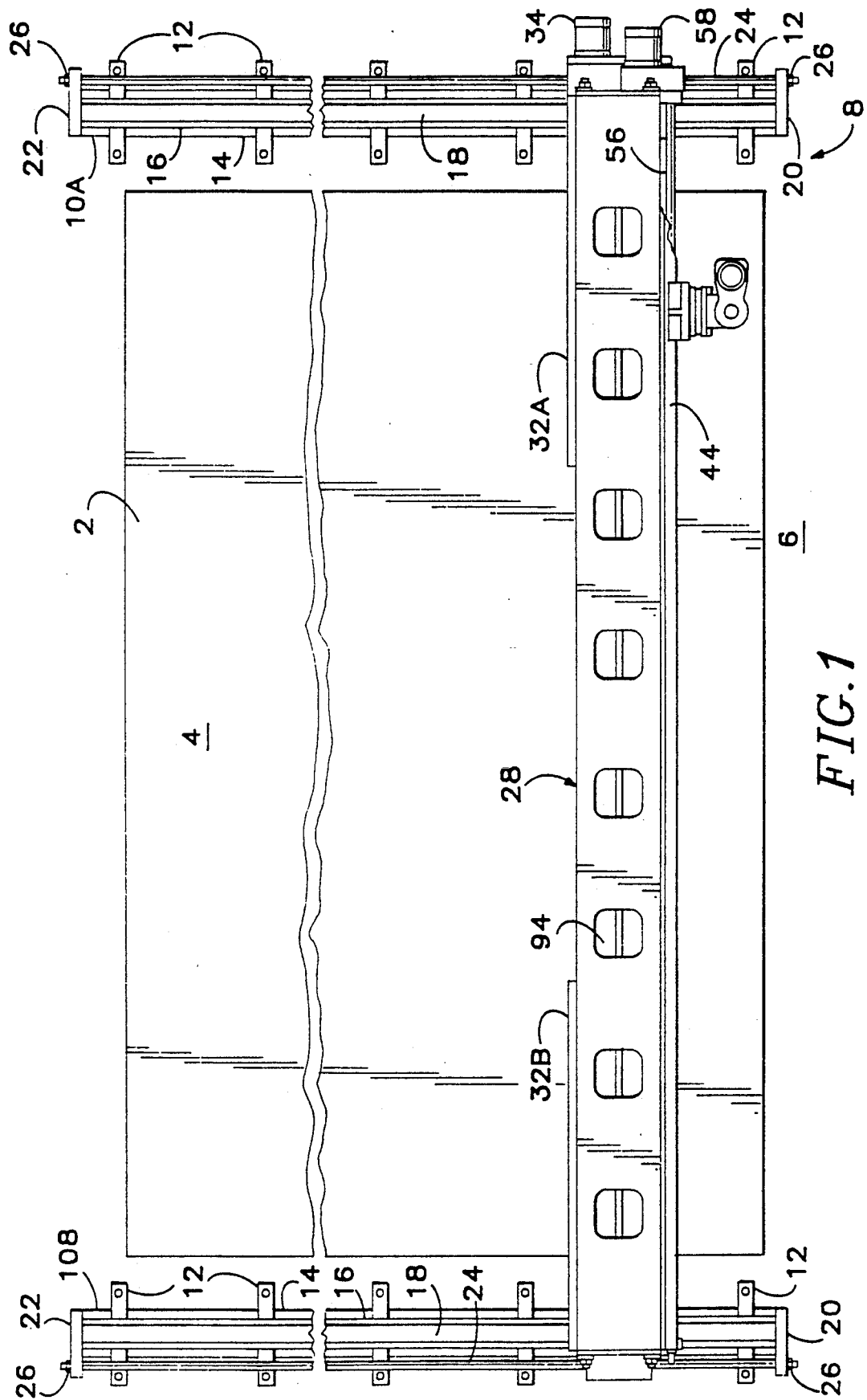
FIG. 1 is a partial top plan view of a milling machine embodying the present invention.

FIG. 1 illustrates work 2 surrounded by a floor 6. The work 2 has a rectangular surface 4 that is nominally horizontal and is to be machined flat. This is accomplished by use of a milling machine 8, which comprises two parallel guide rails 10A, 10B secured to the floor 6 by hold down dogs 12. Each rail 10 comprises a bed plate 14 which supports a bed 16 incorporating a linear way 18.

At the two opposite ends of each rail 10 there are stanchions 20, 22 that extend upwardly from the bed plate. A threaded rod 24 extends between the two stanchions 20, 22 and is secured against movement relative to the stanchions by nuts 26.

Figure 3:
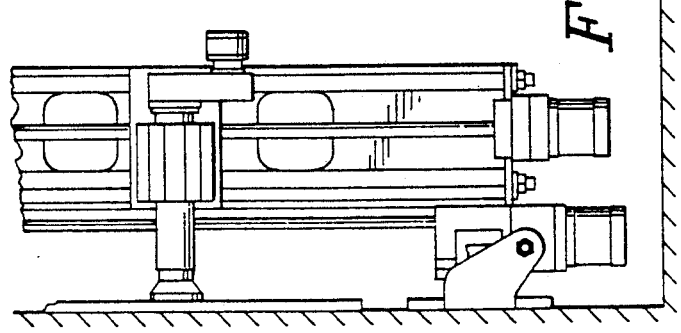
FIG. 3 is a partial side elevation of the milling machine.
Figure 2:
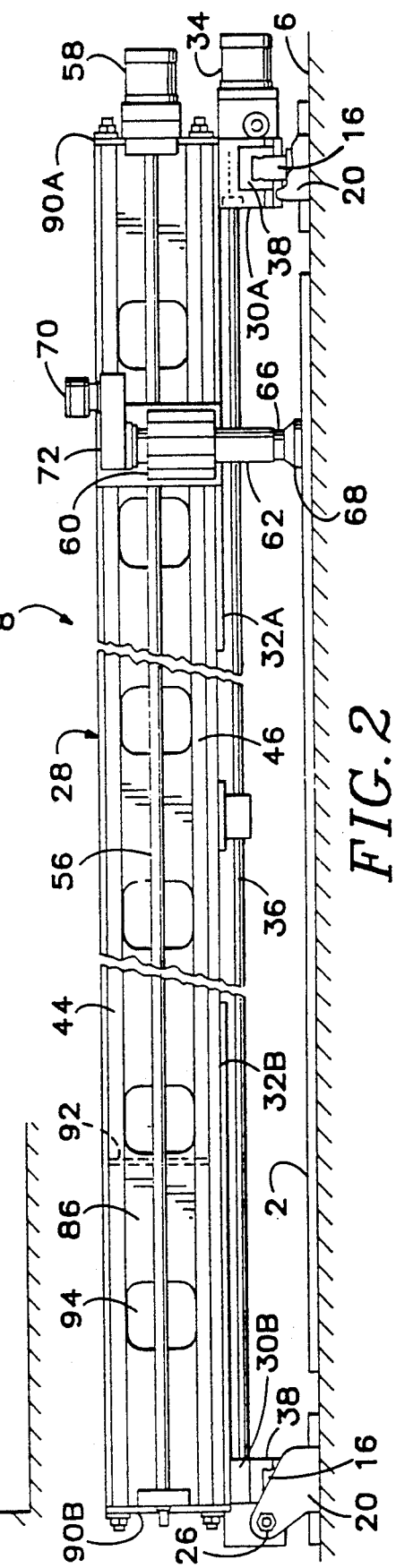
FIG. 2 is an end elevation of the milling machine.

Referring to FIG. 2, carriage blocks 38 are slidable along the linear ways 18 respectively, and gearboxes 30A, 30B are mounted on the carriage blocks 38. The gearboxes 30A, 30B accommodate respective recirculating ball nuts. The ball nut 40A accommodated by the gearbox 30A is shown in FIG. 3. The recirculating ball nuts are in threaded engagement with the threaded rods 24 and are fixed against linear movement relative to the gearboxes. Therefore upon rotation of the nuts, the gearboxes are translated along the guide rails.

Each gearbox has a power input. The power input of the gearbox 30A is connected to a drive motor 34 having an output shaft (not shown) and is coupled through gearing (not shown) to the recirculating ball nut 40A. The power input of the gearbox 30A is also coupled drivingly to a sleeve (not shown) that defines a hexagonal passage. A hexagonal synchronizing shaft 36 is fitted in the sleeve of the gearbox 30A and in a similar sleeve of the gearbox 30B, which sleeve constitutes the power input of the gearbox 30B. The power input of the gearbox 30B is coupled through gearing to the recirculating ball nut accommodated by that gearbox. The gearing incorporated in the gearboxes 30A, 30B is such that when drive is applied to the power input of the gearbox 30A by the motor 34, the recirculating ball nuts of the two gearboxes rotate at the same rate and therefore the gearboxes are translated synchronously along the guide rails. The gearboxes are constructed so that the hexagonal shaft 36 can pass right through each gearbox. This feature allows the distance between the gearboxes to be changed without its being necessary to replace the hexagonal shaft.

A beam 28 that extends over the work 2 is attached to the two gearboxes 30A, 30B through respective mounting plates 32A, 32B. Each gearbox 30 can be bolted to its mounting plate 32 at any one of several locations along the mounting plate, allowing variation in the distance between the two gearboxes.

As shown in FIG. 2, the gearboxes 30A and 30B are at the maximum distance apart permitted by the mounting plates 32A, 32B.

The beam 28 is generally rectangular in section and is provided on one of its four longitudinal sides with two linear ways 44, 46 to which a spindle unit 48 is mounted by means of carriage blocks 50 and a carriage 52. The beam is also provided with a lead screw 56 that extends parallel to the two linear ways 44, 46 and is connected through a gear transmission to a motor 58 that is mounted on the beam 28 at one end thereof. The lead screw 56 is held against longitudinal movement relative to the beam and is in threaded engagement with a nut (not shown) that is mounted in the carriage 52 and is held against movement relative thereto. Thus, by using the motor 58 to drive the lead screw 56, the carriage 52 and the spindle unit 48 can be displaced along the beam.

The spindle unit is of the general kind described in co-pending U.S. patent application Ser. No. 07/590,240 and comprises a quill clamp 60 that is attached to the carriage 52 and accommodates a quill 62 disposed at right angles to the beam 28. The quill in turn supports a rotatable machine tool taper 66 adapted at its lower end to carry a milling cutter 68. The quill 62 is slidable within the quill clamp in order to position the milling cutter vertically under the control of a Z-axis handwheel (not shown). A spindle drive motor 70 is coupled drivingly to the machine tool taper 66 through a spindle gearbox 72. The spindle gearbox 72 and the drive motor 70 are movable vertically relative to the quill clamp 60 while being held against rotation relative to the quill clamp.

During set up of the milling machine, one of the rails, for example, the rail 10A, is placed at the desired position on the floor 6 and is clamped down. The rail 10A is leveled by use of optical techniques, for example by sighting along an axis that is known to be horizontal at a target that is placed successively at each end of the rail and adjusting the height of one or both ends of the rail by inserting or removing shims. The other rail 10B is placed on the floor 6 approximately parallel to the rail 10A and on the opposite side of the work 2 from the rail 10A. The ends of the rails need not be squared to form a rectangle. The gearboxes 30A, 30B are then mounted on the guide rails 10A, 10B and the beam 28 is positioned over the gearboxes, perpendicular to the rail 10A, and the gearboxes 30A and 30B are bolted to the plates 32A and 32B respectively. The beam is driven the full length of travel permitted by the rails whether their ends are squared off or offset. In this fashion, the rail 10B is shifted into exact parallelism with the rail 10A.

The rail 10B is then leveled. Further, the two rails are brought to the same height, for example by sighting a target on each rail along an axis that is known to be horizontal and adjusting the height of one or both rails as necessary.

Figure 4:
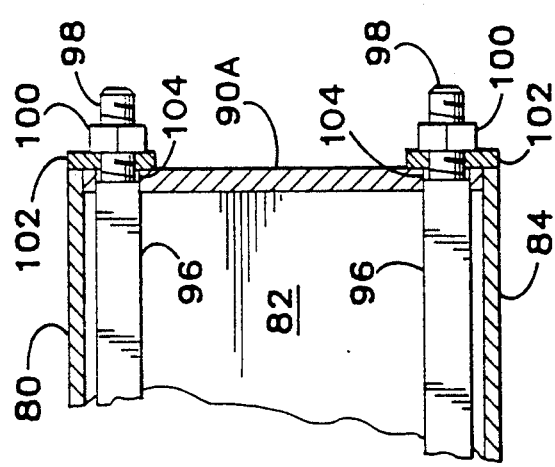
FIG. 4 is an enlarged partial sectional view of the beam.

The beam 28 is of relatively light construction, being a hollow box beam composed of four longitudinal walls 80, 82, 84, 86, two opposite end plates 90A, 90B, and transverse stiffening plates 92 within the interior of the box beam. The beam has lightening openings 94 in its longitudinal walls 80, 82 and 86. The end plates 90A, 90B are each formed with four square openings 104, one at each corner, and four tensioning bars 96 extend within the four corner regions respectively of the box beam. Each tensioning bar 96 passes through one of the openings 104 of each end plate. Each tensioning bar is square in cross section over most of its length and is threaded at its two opposite ends, as shown at 98 in FIG. 4. Each bar is positioned lengthwise so that the segment that is square in cross section enters one of the apertures 104 at each end of the beams, and the apertures 104 are sized to prevent rotation of the bar. The threaded ends of the bars project beyond the end plates of the beam, and each is provided with a nut 100. Corner plates 102 defining circular apertures are fitted on the threaded ends 98 of each bar 96 between the nut 100 and the end plate 90 for transmitting force between the nut 100 and the beam. Use of the corner plates 102 facilitates assembly of the beam, since the bars can be inserted through the square openings in the end plates and the corner plates can then be fitted over the projecting threaded ends 98 of the bars.

In a typical application of the milling machine shown in the drawings, the two rails 10A, 10B are spaced at a distance of about 5 m, and accordingly the beam 28 is deflected downwards between its two opposite ends under its own weight. It will be understood that this deflection results from compression of the beam above a medial plane of the beam and extension of the beam below the medial plane. The medial plane is approximately equidistant from the longitudinal walls 80 and 84. In order to eliminate deflection of the beam, the nuts on the upper pair of tensioning bars are loosened and those on the lower pair are tightened. This applies compression below the medial plane and allows extension above the medial plane, and therefore tends to straighten the beam and eliminate the deflection. The proper degree of loosening and tightening is determined by use of optical measurement techniques. A target is placed on the beam directly above each guide rail and readings are taken with respect to the height of the target relative to a datum level. The target is then placed on the beam about half way between the guide rails, and the nuts 100 are adjusted to bring the target to the same height relative to the datum level.

Figure 5:
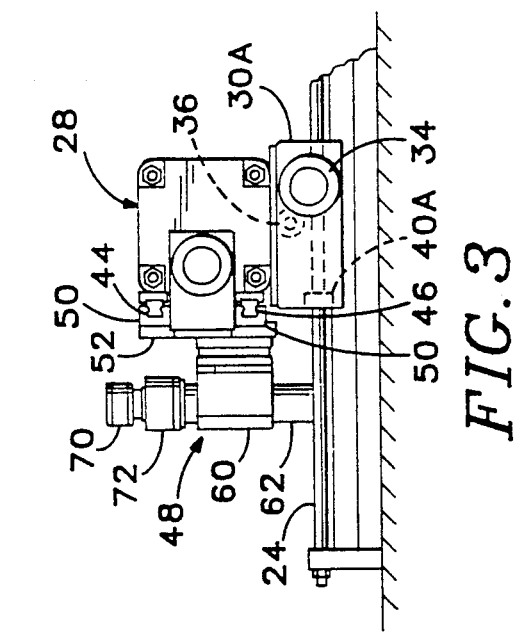
FIG. 5 is a partial end elevation of the machine illustrating the machine in a different orientation from FIG. 2.

As indicated in FIG. 5, the milling machine can be used to mill a vertical surface. The guide rails are attached to a wall or other vertical surface so that they extend horizontally, one above the work and one below the work, and the beam is attached to the guide rails in the manner described with reference to FIGS. 1–4. In the case shown in FIG. 5, in which the beam is disposed vertically, there is no significant deflection of the beam, but it is also possible to mount the guide rails vertically, so that the beam extends horizontally, in which case the two lower tensioning bars are tightened and the two upper tensioning bars are loosened in order to eliminate deflection of the beam.

The quill may be attached to the quill carriage in the opposite orientation from that shown in FIGS. 1-3, so that the milling machine can be used to mill the bottom of the work.

It will be appreciated that the invention is not restricted to the particular embodiment that has been described, and that variations may be made therein without departing from the scope of the invention as defined in the appended claims and equivalents thereof. For example, the invention is not restricted to the beam 28 being substantially square in cross-section, as shown in FIG. 3, or to the specific mechanism employed to key the tensioning bars to the beam.

We claim:

1. A machine tool comprising an elongated beam adapted to be supported in a horizontal orientation at two locations spaced apart therealong and adapted to support a movable machining head, and tensioning members extending in parallel relation to the beam and engaging the beam proximate opposite ends thereof, wherein at least one of the tensioning members for the length thereof is located below the medial plane of the beam, said at least one of said tensioning members being selectively operable in compressive relation to the beam below said medial plane for substantially reducing deflection in the vertical position of said machining head with changes in the horizontal position of said machining head along the beam.

2. A machine tool according to claim 1, wherein the beam is a hollow beam of rectangular cross section having four longitudinal walls, each two adjacent walls meeting at a corner, and the tensioning members comprise four tensioning members extending within the four corners respectively of the beam.

3. A machine tool according to claim 2, wherein each tensioning member comprises a rod having two opposite ends projecting from the two opposite ends respectively of the beam, each rod being threaded at each end, and nuts in threaded engagement with the ends of each rod, whereby tightening of the nuts of a tensioning member applies compressive stress to the beam.

4. A machine tool comprising:
first and second spaced parallel guide rails,
an elongated beam supported in a horizontal orientation by the guide rails and adapted to support a machining head,
tensioning members extending in substantially parallel relation to the beam and engaging the beam proximate opposite ends thereof, at least one of the tensioning members being below the medial plane of the beam at each end thereof, the tensioning members being selectively operable to compress the beam, and
means for adjusting said at least one of said tensioning members to provide a selected degree of tension therein for substantially reducing deflection in the vertical position of said machining head with changes in the horizontal position of the machining head,
wherein each guide rail comprises a profiled guide member and a threaded bar, and the beam is provided at each end with a carriage that is in sliding engagement with the profiled guide member and includes a nut in threaded engagement with the threaded rod and means for driving the nut to rotate relative to the carriage whereby the carriage is driven lengthwise of the rail.

5. A machine tool according to claim 4, comprising means for synchronizing rotation of the nuts relative to the carriages respectively, whereby the two carriages are driven synchronously relative to the respective rails.

6. A machine tool according to claim 5, wherein the synchronizing means comprise a shaft that extends parallel to the beam and is coupled drivingly to each of the nuts.

7. A machine tool according to claim 4 wherein said means for adjusting comprises means for adjusting the relative position between an end of said at least one tensioning means and said beam.

8. A machine tool according to claim 1 including means for adjusting the relative position between an end of said at least one tensioning means and said beam.

9. A machine tool according to claim 8 wherein said end of said at least one tensioning means is threaded and said means for adjusting comprises a nut that can be drawn up relative to a corresponding end of said beam.

10. A machine tool according to claim 7 wherein said end of said at least one tensioning means is threaded and said means for adjusting comprises a nut than can be drawn up relative to the corresponding end of said beam.

* * * * *